US006662083B2

United States Patent
Angel

(10) Patent No.: US 6,662,083 B2
(45) Date of Patent: Dec. 9, 2003

(54) MULTIPLE ROBOTIC WORKSTATION WITH MULTIPLE FIXTURES

(75) Inventor: Jeffrey R. Angel, Lake Orion, MI (US)

(73) Assignee: Progressive Tool & Industries Co., Southfield, MI (US)

(*) Notice: Subject to any disclaimer, the term of this patent is extended or adjusted under 35 U.S.C. 154(b) by 50 days.

(21) Appl. No.: 10/075,852

(22) Filed: Oct. 29, 2001

(65) Prior Publication Data

US 2002/0072825 A1 Jun. 13, 2002

Related U.S. Application Data
(60) Provisional application No. 60/244,517, filed on Oct. 31, 2000.

(51) Int. Cl.$^7$ ............................................ G05B 19/418
(52) U.S. Cl. ...................... 700/248; 700/174; 700/245; 700/249; 700/250; 700/251; 700/254; 700/262; 29/430; 29/469; 29/711; 29/712; 29/791; 29/822; 701/23; 901/1
(58) Field of Search ................................ 700/174, 245, 700/248, 249, 250, 251, 254, 262; 702/95, 94, 104; 356/139.03, 237.2, 394, 600, 152.2, 622; 96/245, 259, 269; 219/90, 86.25; 29/430, 466, 469, 712, 711, 791, 822; 70/23; 901/1

(56) References Cited

U.S. PATENT DOCUMENTS

| | | | |
|---|---|---|---|
| 4,548,346 A | 10/1985 | Kraus et al. ................... 228/47 |
| 4,644,897 A | 2/1987 | Fender ........................ 118/323 |
| 4,736,515 A | 4/1988 | Catena .......................... 29/714 |
| 4,740,133 A | 4/1988 | Kawano | |
| 4,795,021 A | 1/1989 | Möller ..................... 198/346.1 |
| 4,863,092 A | 9/1989 | Nguyen ....................... 228/212 |
| 4,928,383 A | * | 5/1990 | Kaczmarek et al. ......... 348/139 |
| 5,083,070 A | 1/1992 | Poupard et al. ........... 318/568.1 |
| 5,111,988 A | 5/1992 | Strickland .................... 228/102 |
| 5,115,560 A | 5/1992 | Erb et al. ...................... 29/747 |
| 5,150,624 A | 9/1992 | Kaczmarek et al. ........ 73/865.9 |
| 5,152,050 A | * | 10/1992 | Kaczmarek et al. ......... 700/245 |
| 5,186,304 A | 2/1993 | Kaczmarek et al. ..... 198/346.1 |
| 5,239,739 A | * | 8/1993 | Akeel et al. ................... 29/430 |
| 5,240,746 A | 8/1993 | O'Connell Litteral ...... 427/510 |
| 5,265,317 A | * | 11/1993 | Angel .......................... 29/429 |
| 5,272,805 A | * | 12/1993 | Akeel et al. ................... 29/712 |
| 5,370,745 A | 12/1994 | Litteral ........................ 118/669 |
| 5,640,756 A | 6/1997 | Brown et al. ................. 29/701 |
| 5,739,499 A | * | 4/1998 | Suzio et al. ................... 219/90 |
| 5,748,505 A | * | 5/1998 | Greer .......................... 702/104 |
| 6,014,851 A | 1/2000 | Daniele et al. ............... 53/430 |
| 6,078,846 A | * | 6/2000 | Greer et al. ................ 700/174 |

(List continued on next page.)

FOREIGN PATENT DOCUMENTS

| | | | |
|---|---|---|---|
| DE | 197 13 860 | 10/1998 | ............ B23Q/7/14 |
| FR | 2773092 | 7/1999 | ........... B23P/21/00 |

OTHER PUBLICATIONS

Jouaneh et al., Trajectory planning for coordinated motion of a robot and a positioning table: Part 1—Path specification, 1990, IEEE, pp. 735–745.*

(List continued on next page.)

Primary Examiner—William A. Cuchlinski, Jr.
Assistant Examiner—McDieunel Marc
(74) Attorney, Agent, or Firm—Young & Basile, P.C.

(57) ABSTRACT

A workstation having multiple robots and multiple fixtures for processing multiple workpieces along two processing paths. A first fixture can be positioned on the first processing path and a second fixture can be positioned on the second processing path. The multiple robots are positioned between the two paths and are moveable to process workpieces moving along both the first and second paths. The robots can be welding robots. The robots can be independently moveable with respect to each other to enhance the efficiency of the workstation. The robots can have overlapping ranges of movement so that every portion of the workpiece can be processed by at least two of the robots.

20 Claims, 2 Drawing Sheets

U.S. PATENT DOCUMENTS

| | | | |
|---|---|---|---|
| 6,128,585 A | * | 10/2000 | Greer .......................... 702/104 |
| 6,166,811 A | * | 12/2000 | Long et al. .................. 356/602 |
| 6,180,939 B1 | * | 1/2001 | Markey et al. ............. 250/238 |
| 6,197,115 B1 | * | 3/2001 | Barrey et al. ............... 118/681 |
| 6,266,138 B1 | * | 7/2001 | Keshavmurthy ......... 356/237.2 |
| 6,285,959 B1 | * | 9/2001 | Greer .......................... 702/95 |
| 6,453,210 B1 | * | 9/2002 | Belotserkovskiy et al. ... 700/96 |

OTHER PUBLICATIONS

Bobrow et al., Minimum–time trajectories for two robot holding the same workpiece, 1990, IEEE, pp. 3102–3107.*

Ivkovich et al., Arc–weld monitoring with coordinated part tracking, (5th Robotic arc welding cofference adn exhibition), 2001, Internet, pp. 1–21.*

Rexroth Bosch Group, Drive & Control, 2001, Internet, pp. 36.*

MOTOMAN, Arc world II—6200 HD and 6300 HD, 2000, Internet, 1–2.*

Chriestensen, Automated spot welding, 2001, Internet, pp. 1–21.*

Keynes et al., Avanced manufacturing, 2000, Internet, pp. 1–22.*

Larsson et al., Laser welding a mature process technology with various application fileds, 1999, Internet, pp. 43–50.*

* cited by examiner

MULTIPLE ROBOTIC WORKSTATION WITH MULTIPLE FIXTURES

CROSS-REFERENCE TO RELATED APPLICATIONS

This application claims the benefit of the provisional patent application No. 60/244,517 for a Multiple Robotic Workstation With Multiple Fixtures, filed on Oct. 31, 2000. This claim is made under 35 U.S.C. §119(e) and 37 C.F.R. 1.53(c)(3).

FIELD OF THE INVENTION

The invention relates to a workstation having multiple robots and multiple fixtures, and more specifically, the invention provides welding workstations for automotive assembly lines having multiple independently-working welding robots and multiple fixtures for holding workpieces.

BACKGROUND OF THE INVENTION

The efficiency of a welding workstation can be defined by the amount of time, normally a percentage, that a welding robot spends welding compared to the total time required for a particular repetitive cycle. The efficiency of the workstation relates to the amount of time that a welding robot takes to perform various welding operations compared to the total amount of time that the welding robot requires for a particular repetitive cycle. Idle time for a welding robot can occur when a new workpiece is loaded and prepared in a fixture. If the workstation has one welding robot and one fixture, the welding robot will stand idle as a completed part is unloaded from the fixture and a new workpiece is loaded onto the fixture. In the prior art, this problem was addressed by adding a second fixture at the workstation within reach of a single welding robot. In a workstation with two fixtures, the welding robot can complete welding operations at one fixture while workpieces are being loaded and unloaded at the second fixture. When the welding process is complete at the first fixture, the welding robot can move to the second fixture and immediately commence welding.

The amount of time that a workpiece is positioned in a fixture while work is being performed compared to the total amount of time that a workpiece is positioned in a fixture corresponds to workpiece efficiency. The amount of time that a workpiece sits idle in a fixture reduces the overall operating capacity of the workstation by reducing throughput, normally reported in parts per hour or similar units for the overall assembly process. In a workstation having one fixture and one welding robot, the amount of time that a workpiece sits idle in the fixture is minimized because the welding robot immediately commences welding operations as soon as a workpiece is loaded and any other setup procedures are completed. However, in a workstation that has two fixtures and one welding robot, a workpiece is loaded onto one fixture, is setup, and then sits idle until the welding robot completes welding operations at the second fixture. Therefore, in a workstation having one fixture and one welding robot, the workpiece efficiency is maximized while in a workstation having two fixtures and one welding robot the welding efficiency is maximized. It is desirable to provide a workstation wherein the welding efficiency and the workpiece efficiency are both enhanced.

SUMMARY OF THE INVENTION

The present invention includes a workstation having multiple robots and multiple fixtures. The workstation can perform processing operations on multiple workpieces sequentially or simultaneously. The robots performing processing operations on the workpieces are disposed between the fixtures and are independently movable relative to each other. The fixtures can be rotatable about a horizontal axis to position one of two or four major surfaces in a ready position for receiving workpieces. Each major surface has a separate workpiece rest for receiving workpieces of different configurations.

The present invention also includes a plurality of similar workstations positioned in sequence along an assembly line. A transfer robot can be disposed in between adjacent workstations for moving workpieces from one workstation to the next. The present invention can also include a robot for processing the workpieces while held by the transfer robot in between the adjacent workstations.

The present invention also provides an electronic control means for coordinating the movements of the processing robots. The electronic control means is programmable for processing any mix of workpieces of different configurations in any sequential order. The electronic control means presents the appropriate workpiece nest in the ready position to receive the workpiece to be processed next and operates the plurality of robots in programmable sequence to perform the necessary welding in an efficient manner for the particular workpiece.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like workpieces throughout the several views, and wherein.

DESCRIPTION OF THE PREFERRED EMBODIMENT

Figure 1:
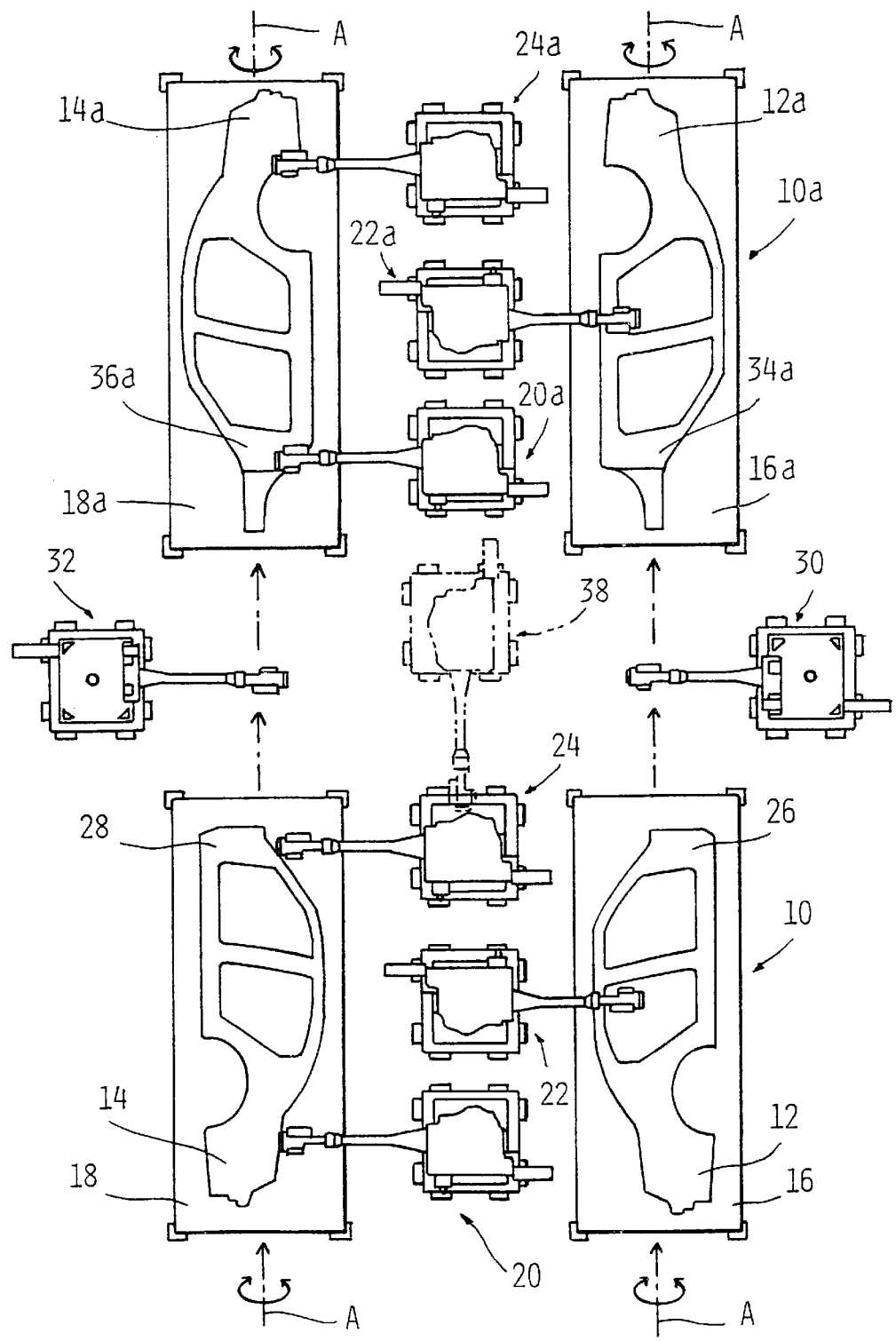
FIG. 1 is an overhead view of a workstation according to the present invention.
Figure 2:
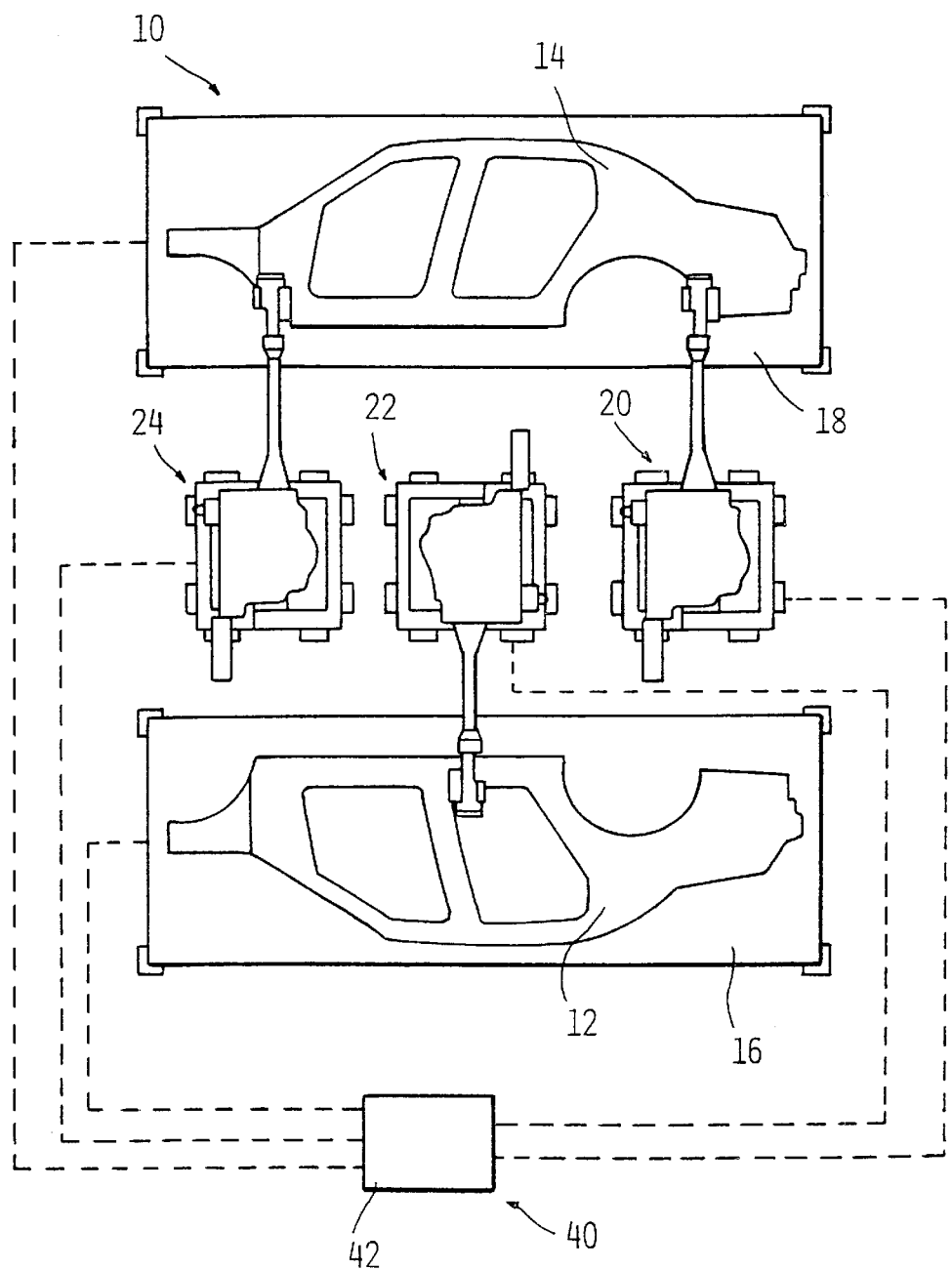
FIG. 2 is a schematic view of an electronic control means for the workstation according to the present invention.

A workstation 10 according to the present invention includes a multiple robotic workstation with multiple fixtures for processing multiple workpieces 12 and 14 of the same or different configurations sequentially or concurrently. The workstation 10 of the present invention has at least two fixtures, a first fixture 16 and a second fixture 18. The workstation 10 includes multiple robots located interposed between the fixtures 16, 18. In a preferred embodiment of the present invention, the workstation 10 has three robots 20, 22 and 24 positioned in between the two fixtures 16, 18 with overlapping areas of reach between adjacent robots.

The fixtures 16 and 18 are operable to hold workpieces 12 and 14, respectively, in position for a processing operation. Preferably, the fixtures 16 and 18 located at workstation 10 are capable of positioning a plurality of workpiece nests corresponding to the desired body style and model to be processed through the workstation 10. In the preferred configuration, each of the fixtures 16 and 18 include four different workpiece nests positioned on four major surfaces of a fixture having a rectangular or square cross-section and rotatable about a horizontal axis A to position one of the four major surfaces in an upright, ready position for receiving workpieces to be processed at the workstation 10.

The robots 20, 22 and 24 are positioned between fixtures 16 and 18 with overlapping areas of reach between adjacent robots, preferably so that at least two robots can reach all areas of the workpiece to be processed. The robots 20, 22 and 24 are independently movable with respect to each other. Also, the processing robots 20, 22 and 24 are capable of performing various independent work cycles at each fixture. As used herein, "work cycle" refers to a particular quantity and configuration of processing operations on a part 12 or 14. In a preferred embodiment of the workstation 10, three robots 20, 22 and 24 are positioned between the fixtures 16, 18. However, the present invention can be practiced with more than three robots. By way of example and not limitation, the robots 20, 22 and 24 can be welding robots. Each robot can perform welding operations at both fixtures 16 and 18. The robots 20, 22 and 24 are disposed between fixtures 16 and 18 so that each robot can perform welding operations at programmed areas of the fixtures 16 and 18. By way of example and not limitation, as shown in FIG. 1, robot 24 can be used to perform welding operations at one end of fixture 18 and one end of fixture 16, while robot 20 can be performing welding operations at the other end of fixture 18 and the other end of fixture 16. In such an embodiment of the present invention, robot 22 can be used to perform welding operations in the middle of fixture 16 and the middle of fixture 18. Further, the robot 22 can also be used for welding operations at either end of fixture 16 and fixture 18. By way of example and not limitation, if part 12 requires relatively numerous welding operations at end 26 and part 14 requires numerous welding operations at end 28, robots 22 and 24 can each be responsible for a portion of the total number of welding operations required for both ends 26 and 28 of the parts 12 and 14. The workstation 10 of the present invention provides flexibility in distributing the relative work loads among the robots 20, 22 and 24.

It is desirable in the present invention to provide a workstation 10 for performing welding operations on multiple workpieces 12 and 14 by multiple robots 20, 22 and 24 while enhancing the overall efficiency of the workstation 10. The workstation 10 is operable to perform welding operations on different components simultaneously or sequentially. By way of example and not limitation, part 14 can be an automotive floor pan (not shown) while part 12 can be an automotive body side assembly. These different styles of workpieces can be simultaneously processed at the workstation 10. Furthermore, the operation of the robots 20, 22 and 24 can be synchronized to process different workpieces. The floor pan of this example generally requires a greater amount of time to load and setup for welding than a right hand body side assembly. However, the right hand body side assembly requires a greater number of welding operations than a floor pan. Workstation 10 according to the present invention, can begin welding the right hand body side assembly with the welding robots 20, 22 and 24 as soon as the right hand body side assembly is loaded onto fixture 16, while the floor pan is being loaded into fixture 18 and set up for welding. One or more of the welding robots 20, 22 and 24 can be repositioned once the floor pan has been loaded onto the fixture 18 and setup to weld a first series of welds, such as to attach brackets to the floor pan. After welding the brackets to the floor pan, the one or more robots can return to welding the right hand body side assembly, while additional components are set up with respect to the floor pan prior to returning for a second series of welds. For workpieces that require additional loading after one or more welding operations, the welding robots 20, 22 and 24 can move between the fixtures while the additional loading occurs and return to the workpiece when loading is complete.

The workstation 10 can also be positioned adjacent to an identical workstation 10a. As shown in FIG. 1, two workstations 10, 10a can be positioned adjacent to each other on an automotive assembly line. In such a configuration, transfer robots 30 and 32 can move workpieces from one fixture at one workstation 10 to the next workstation 10a for processing by robots 20a, 22a, and 24a. The transfer robots 30 and 32 can grasp the respective workpieces at appropriate locations for lifting the workpieces out of the fixtures 16, 18 at the first workstation 10 and positioning the workpieces at the fixtures 16a, 18a at the second workstation 10a. The transferring of workpieces between workstations 10, 10a can also be set to perform a processing operation. Robot 38 shown in phantom in FIG. 1 can be positioned above and between the two workstation 10, 10a for applying a sealant or an adhesive to the workpiece while being held by one of the transfer robots 30, 32 during movement between fixtures 16, 16a and 18, 18a respectively. By way of example and not limitation, transfer robot 30 can grasp the part 12 from end 26, lift the part 12 out of the fixture 16 at the first workstation 10, hold the part 12 in an elevated position between the workstations 10, 10a, and allow the robot 38 to apply a sealant or an adhesive to the part 12 before the part 12 is loaded onto the fixture 16a at the second workstation 10a.

The workstation 10 of the present invention can also include an electronic control means 40. The electronic control means 40 can control the position of the welding robots 20, 22 and 24 according to programmed repetitive movements. The electronic control means 40 can include a central processing unit 42. The central processing unit 42 can receive a signal corresponding to the configuration of the respective workpieces to be worked on next, and the number and position of welds to be performed on the workpiece.

The central processing unit 42 is operable to receive a signal relating to the configuration of the workpieces to be loaded next onto fixtures 16 and 18, respectively. This information is used to recall the programmed repetitive movement for the robots to accomplish the desired welding operations to be performed to control the position of the welding robots 20, 22 and 24 during the welding cycle. An infinite variety of workpieces can be processed with various loading times, preparation times, and welding times according to the present invention. The present invention provides a workstation 10 having multiple processing robots 20, 22, 24 and multiple fixtures 16, 18 for processing multiple workpieces 12, 14 sequentially or simultaneously at an improved rate of workstation efficiency.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A workstation for processing a plurality of workpieces comprising:

a first fixture positionable along a first processing path for supporting a first workpiece moveable along the first processing path;

a second fixture positionable along a second processing path for supporting a second workpiece moveable along the second processing path; and a plurality of robots positionable between the first and second fixtures, each robot moveable to selectively engage each of the first and second workpieces, wherein at least one robot can process the first workpiece while at least one other robot can process the second workpiece.

2. The apparatus of claim 1 wherein at least two of the robots have overlapping ranges of movement.

3. The apparatus of claim 1 wherein the plurality of robots further comprises:

at least three robots, a first robot operable to engage a first portion of the first workpiece, a second robot operable to engage a second portion of the first workpiece, and a third robot operable to engage the first and second portions of the first workpiece.

4. The apparatus of claim 1 wherein each robot is independently moveable with respect to at least one other robot.

5. The apparatus of claim 1 wherein each robot is operable to perform a plurality of different processing operations.

6. The apparatus of claim 1 wherein the plurality of robots can concurrently engage one of the first and second workpieces.

7. The apparatus of claim 1 further comprising:

a third fixture adjacent the first fixture along the first processing path, and a fourth fixture adjacent the second fixture along the second processing path, each of the third and fourth fixtures for supporting at least one workpiece during a processing operation with respect to the workpiece.

8. The apparatus of claim 7 further comprising:

a transfer robot for moving workpieces between the fixtures positioned along at least one of the first and second processing paths.

9. A workstation for processing a plurality of workpieces comprising:

a first fixture positionable along a first processing path for supporting a first workpiece moveable along the first processing path;

a second fixture positionable along a second processing path for supporting a second workpiece moveable alone the second processing path;

a plurality of robots positionable between the first and second fixtures, each robot moveable to selectively engage each of the first and second workpieces;

a third fixture adjacent the first fixture along the first processing path;

a fourth fixture adjacent the second fixture alone the second processing path, each of the third and fourth fixtures for supporting at least one workpiece during a processing operation with respect to the workpiece;

a transfer robot for moving workpieces between the fixtures positioned along at least one of the first and second processing paths; and a processing robot for processing a workpiece while the workpiece is engaged by the transfer robot.

10. The apparatus of claim 1 further comprising:

control means for controlling each of the plurality of robots.

11. The apparatus of claim 1 further comprising:

means for determining the next workpiece to be supported by at least one of the first and second fixtures.

12. The apparatus of claim 1 further comprising:

at least one of the fixtures operable to selectively support a plurality of differently configured workpieces.

13. A method for processing a plurality of workpieces moveable along first and second processing paths comprising the steps of:

selectively supporting at least two workpieces with first and second fixtures, the first fixture positionable along the first processing path and the second fixture positionable along the second processing path; and engaging each workpiece with a plurality of robots positionable between the first and second processing paths, each robot operable to selectively engage each workpiece supported by the first and second fixtures, wherein at least one robot can process the first workpiece while at least one other robot can process the second workpiece.

14. The method of claim 13 further comprising the step of:

moving each of the plurality of robots independently with respect to at least one other robot.

15. The method of claim 13 further comprising the step of:

moving each of the plurality of robots to concurrently engage one of the first and second workpieces.

16. The method of claim 13 further comprising the steps of:

moving a first workpiece along the first processing path; and moving a second workpiece along the second processing path, the first workpiece and second workpiece having different configurations with respect to each other.

17. An apparatus for processing a plurality of workpieces comprising:

a first fixture positionable along a first processing path for supporting a first workpiece;

a second fixture positionable along a first processing path for supporting a second workpiece; and a plurality of robots positionable between the first and second processing paths, each robot independently moveable with respect to each other to selectively engage each of the first and second workpieces, wherein at least one robot can process the first workpiece while at least one other robot can process the second workpiece.

18. The apparatus of claim 17 wherein the plurality of robots are welding robots.

19. The apparatus of claim 17 wherein at least one of the first and second fixtures is operable to selectively receive one of a plurality of differently configured automotive body components.

20. The apparatus of claim 17 wherein the plurality of robots can engage one of the first and second workpieces while the other of the first and second workpieces is being replaced in the corresponding fixture.

* * * * *